United States Patent
Chen et al.

(10) Patent No.: US 11,043,853 B2
(45) Date of Patent: Jun. 22, 2021

(54) WIRELESS CHARGING SYSTEM HAVING MEASUREMENT CIRCUITRY WITH FOREIGN OBJECT DETECTION CAPABILITIES

(71) Applicant: Apple Inc., Cupertino, CA (US)

(72) Inventors: Liang Chen, Auckland (NZ); Andrew Gray, Auckland (NZ); Arunim Kumar, Auckland (NZ); Zachary Strachan Harris, Auckland (NZ); Antoin J. Russell, Cupertino, CA (US); Bharat K. Patel, San Jose, CA (US); Saining Ren, Auckland (NZ); Jerald Polestico Guillermo, Auckland (NZ); Ron Rafer Floresca, Auckland (NZ)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 15/981,814

(22) Filed: May 16, 2018

(65) Prior Publication Data

US 2018/0337549 A1    Nov. 22, 2018

Related U.S. Application Data

(60) Provisional application No. 62/507,692, filed on May 17, 2017.

(51) Int. Cl.
*H02J 50/60* (2016.01)
*H02J 7/02* (2016.01)
(Continued)

(52) U.S. Cl.
CPC .............. *H02J 50/60* (2016.02); *H02J 7/025* (2013.01); *H02J 50/10* (2016.02); *H02J 50/12* (2016.02);
(Continued)

(58) Field of Classification Search
CPC .......... H02J 7/025; H02J 7/0042; H02J 50/40; H02J 50/60; H02J 50/12; H02J 50/10; H04B 5/0037; H04B 5/0075
(Continued)

(56) References Cited

U.S. PATENT DOCUMENTS 8,446,046 B2    5/2013    Fells et al.
8,674,551 B2    3/2014    Low et al.
(Continued)

FOREIGN PATENT DOCUMENTS

| CN | 103427501 | 4/2013 |
| EP | 3124313 | 2/2017 |
| WO | 2016076733 | 5/2016 |

*Primary Examiner* — Richard Isla
*Assistant Examiner* — Manuel Hernandez
(74) *Attorney, Agent, or Firm* — Treyz Law Group, P.C.; Jason Tsai

(57) ABSTRACT

A wireless power transmitting device transmits wireless power signals to a wireless power receiving device using an output circuit that includes a wireless power transmitting coil. Measurement circuitry is coupled to the output circuit to help determine whether the wireless power receiving device is present and ready to accept transmission of wireless power. Oscillator circuitry for supplying signals to the output circuitry while making measurements with the measurement circuitry is coupled to the output circuit using an impedance injection network. The impedance injection network includes an inductor and a resistor coupled in series. Control circuitry opens a transistor in the output circuit when making measurements with the measurement circuitry and closes the transistor when transmitting the wireless power signals.

23 Claims, 10 Drawing Sheets

(51) Int. Cl.
*H04B 5/00* (2006.01)
*H02J 50/12* (2016.01)
*H02J 50/40* (2016.01)
*H02J 50/10* (2016.01)
*H02J 7/00* (2006.01)

(52) U.S. Cl.
CPC ............ *H02J 50/40* (2016.02); *H04B 5/0037* (2013.01); *H04B 5/0075* (2013.01); *H02J 7/0042* (2013.01)

(58) Field of Classification Search
USPC .......................................... 320/108; 307/104
See application file for complete search history.

(56) References Cited

U.S. PATENT DOCUMENTS

| | | | |
|---|---|---|---|
| 9,209,627 B2 | 12/2015 | Baarman et al. | |
| 2008/0030166 A1* | 2/2008 | Cato | H02J 7/0031 320/111 |
| 2010/0084918 A1* | 4/2010 | Fells | H02J 5/005 307/32 |
| 2012/0007437 A1 | 1/2012 | Fells et al. | |
| 2012/0068550 A1 | 3/2012 | Boer et al. | |
| 2014/0125287 A1* | 5/2014 | Nakano | H02J 50/12 320/128 |
| 2014/0167704 A1* | 6/2014 | Lafontaine | H02J 50/90 320/137 |
| 2015/0321567 A1 | 11/2015 | Czainski | |
| 2015/0349543 A1* | 12/2015 | Sakata | H02J 50/70 307/104 |
| 2016/0028248 A1* | 1/2016 | Asanuma | H02J 50/90 307/104 |
| 2016/0134154 A1 | 5/2016 | Baarman et al. | |
| 2016/0248279 A1 | 8/2016 | Nakano et al. | |
| 2017/0117755 A1* | 4/2017 | Muratov | H02J 50/60 |
| 2017/0141622 A1* | 5/2017 | Meichle | H02J 7/025 |
| 2019/0157914 A1* | 5/2019 | Watanabe | H02J 50/12 |
| 2019/0225099 A1* | 7/2019 | Sieber | H02J 50/12 |
| 2020/0169123 A1* | 5/2020 | Mehas | H02J 7/025 |
| 2020/0212723 A1* | 7/2020 | Lu | H02J 50/60 |
| 2020/0266671 A1* | 8/2020 | Choi | H02J 50/70 |

\* cited by examiner

WIRELESS CHARGING SYSTEM HAVING MEASUREMENT CIRCUITRY WITH FOREIGN OBJECT DETECTION CAPABILITIES

This application claims the benefit of provisional patent application No. 62/507,692, filed on May 17, 2017 which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to a portable electronic device. The portable electronic device receives the wirelessly transmitted power and uses this power to charge an internal battery or to power the device.

SUMMARY

In some situations, foreign objects may be accidentally placed on a charging surface. This can pose challenges when performing wireless power transmission operations. To address these challenges, a wireless power system is provided with foreign object detection capabilities.

In the system, a wireless power transmitting device transmits wireless power signals to a wireless power receiving device. The wireless power transmitting device has an inverter that supplies signals to an output circuit that includes a wireless power transmitting coil. The wireless power transmitting coil may be part of an array of wireless power transmitting coils that cover a wireless charging surface associated with the wireless power transmitting device.

Signal measurement circuitry is coupled to the output circuit to help determine whether the wireless power receiving device is present and ready to accept transmission of wireless power. The measurement circuitry includes a measurement circuit that is coupled to the output circuit and that measures signals while oscillator circuitry supplies the output circuit with signals at a probe frequency. Using measurements from this measurement circuitry at one or more probe frequencies, the wireless power transmitting device determines whether an external object is present on the coils. The oscillator circuitry is coupled to the output circuit with an impedance injection network having an inductor and resistor coupled in series.

Impulse response circuitry in the measurement circuitry is coupled to the output circuit and used to measure the response of the output circuit to an impulse signal supplied by an inverter in the wireless power transmitting device. The impulse response circuitry is used to make inductance and Q factor measurements.

During operation, information from the impulse response circuitry and measurements at the probe frequency can be used in determining whether a wireless receiving device is present over particular coils in wireless charging surface and can therefore be used in adjusting wireless power transmission with the wireless power transmitting device.

The measurement circuitry also includes a measurement circuit that is coupled to the output circuit and that measures signals while the oscillator circuitry sweeps an alternating-current output signal between a first frequency and a second frequency. Measurements resulting from frequency-sweeping operations are used to detect sensitive devices such as radio-frequency identification devices. If sensitive devices are detected, potentially damaging wireless power transmission operations can be avoided.

Switching circuitry is used to dynamically switch selected coils from the coil array that overlaps the charging surface into the output circuit, so that appropriate coils in the coil array can be probed for the presence of external objects and sensitive devices such as radio-frequency identification devices.

The output circuit has a transistor coupled to the wireless power transmission coil. The transistor is closed when the wireless power signals are transmitted with the wireless power transmission coil and is opened when the measurement circuitry makes measurements.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, or other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
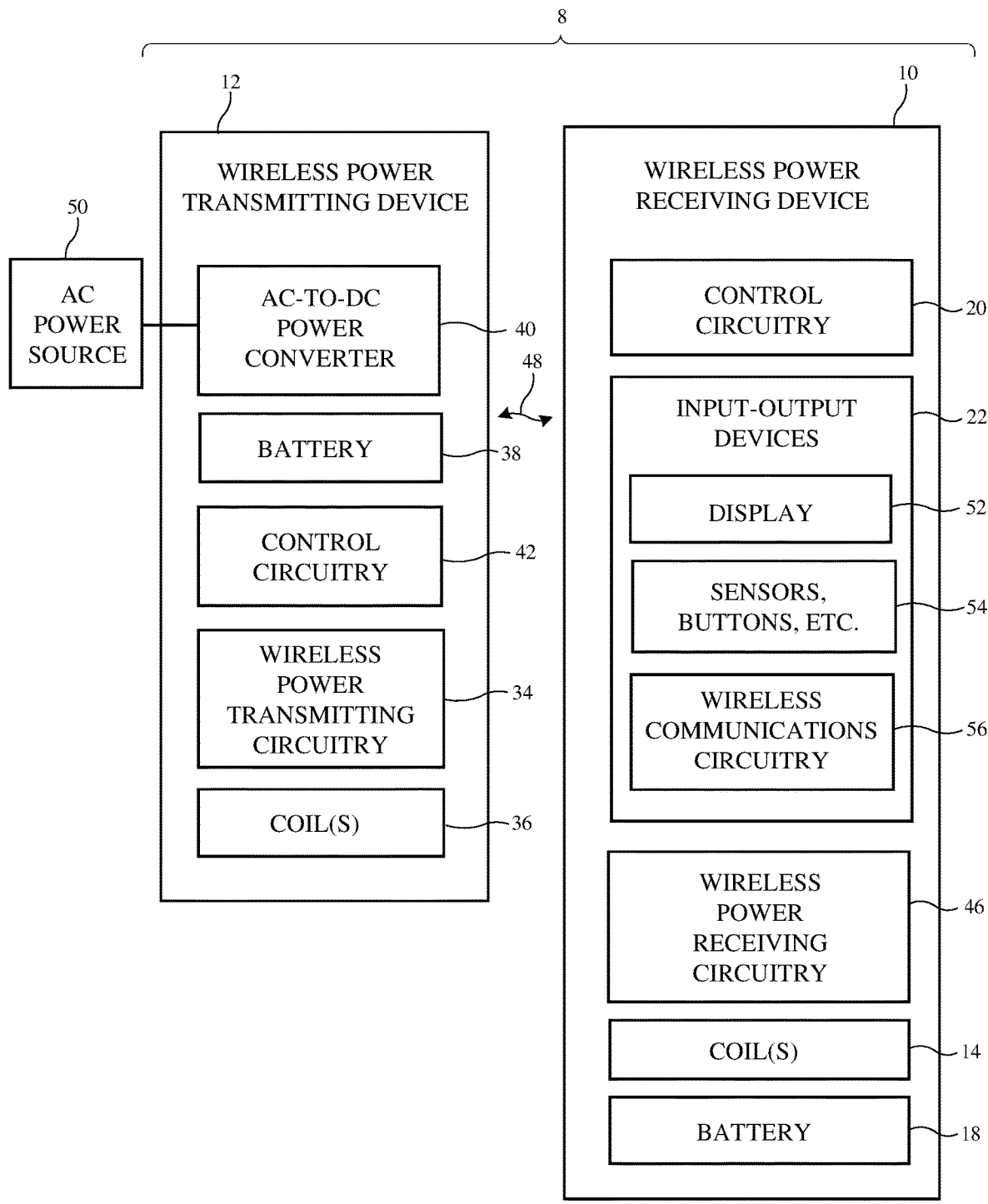
FIG. 1 is a schematic diagram of an illustrative wireless charging system in accordance with some embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations may sometimes be described herein as an example.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the inverter circuit, alternating-current electromagnetic fields (wireless power signals 48) are produced that are received by one or more corresponding coils 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from one or more coils 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with control circuitry 42 of device 12 and/or other equipment, audio components, and other components (e.g., input-output devices 22 and/or control circuitry 20) and are used in charging an internal battery in device 10 such as battery 18.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

Figure 2:
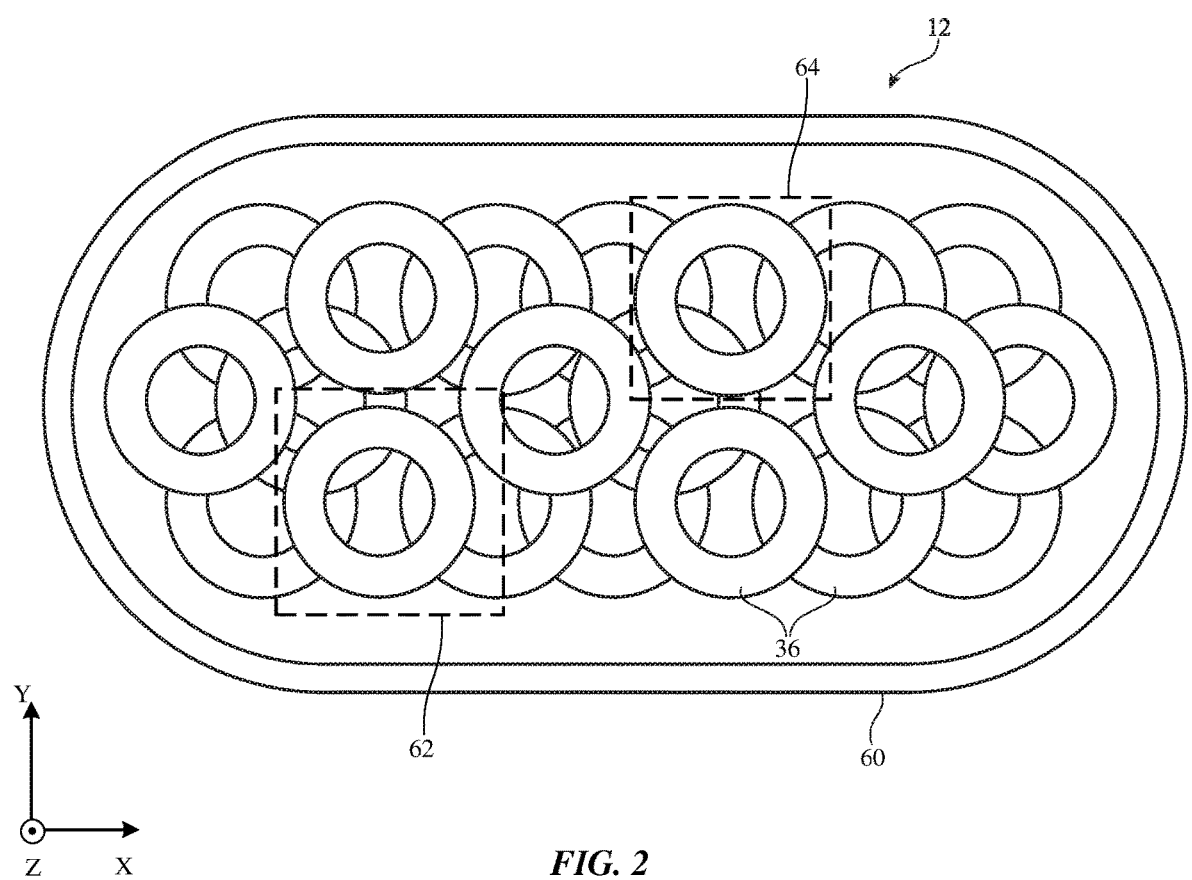
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

During operation, a user places one or more devices 10 on charging surface 60. Foreign objects such as coils, paper clips, scraps of metal foil, and/or other foreign conductive objects may be accidentally placed on surface 60. System 8 automatically detects whether conductive objects located on surface 60 correspond to devices 10 or incompatible foreign objects and takes suitable action. With one illustrative arrangement, system 8 checks whether objects located on surface 60 include sensitive items such as radio-frequency identification (RFID) devices or other potentially sensitive electronic equipment that could be potentially damaged upon exposure to large fields from coils 36 before system 8 allows wireless power to be transmitted to those objects.

As shown in the example of FIG. 2, external objects such as external object 62 and object 64 may overlap one or more coils 36. In some situations, objects 62 and 64 will be portable electronic devices 10. In other situations, one or more of objects 62 and 64 will be incompatible external objects (e.g., conductive foreign objects such as metallic coins, sensitive devices such as RFID devices, etc.). Situations may also arise in which incompatible external objects and portable electronic devices overlap the same coil or coils 36.

Figure 3:
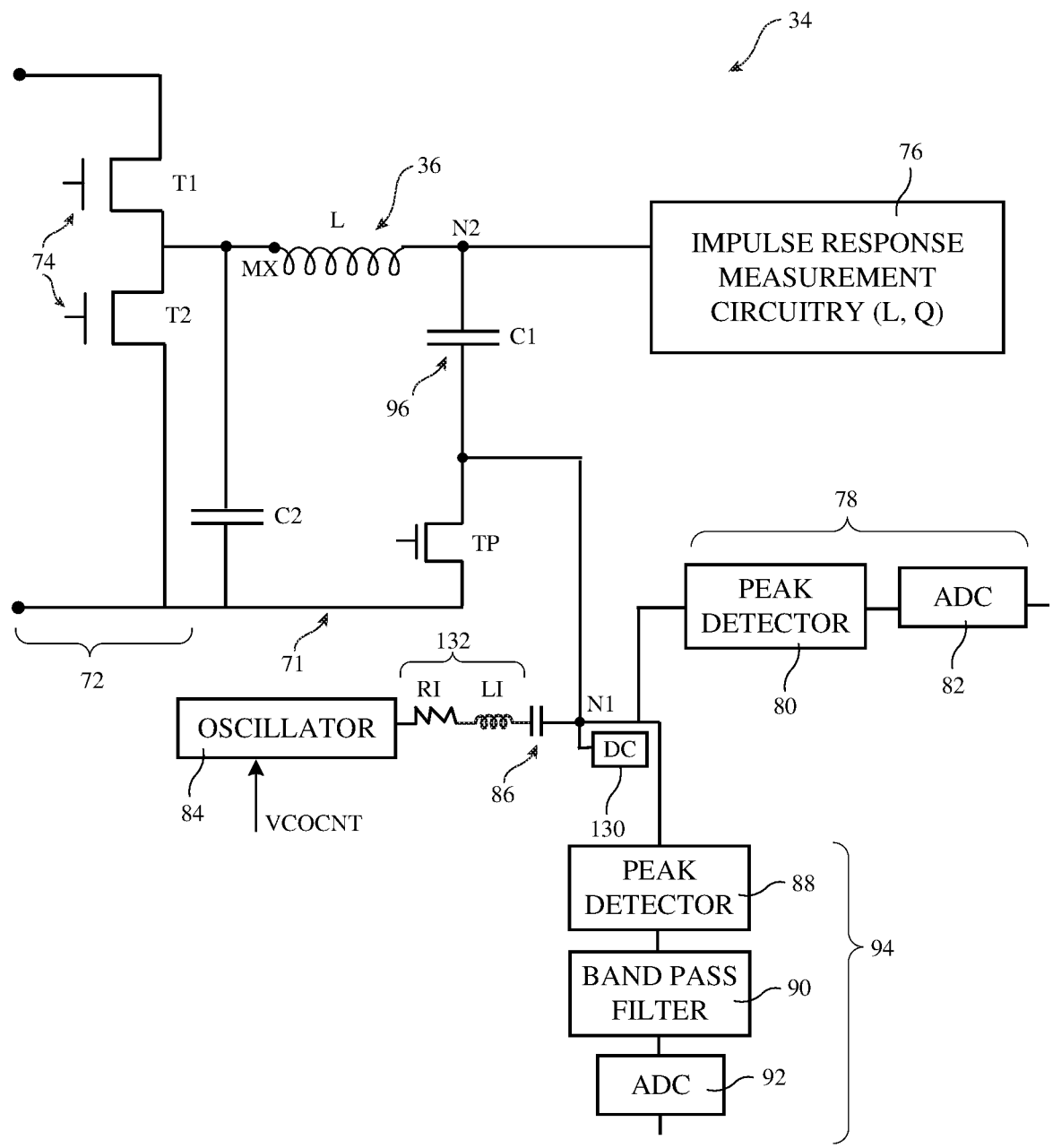
FIG. 3 is a circuit diagram of illustrative wireless power transmitting circuitry with output circuit signal measurement circuitry in a wireless power transmitting device in accordance with an embodiment.

Illustrative wireless power transmitting circuitry 34 that includes circuitry to detect and characterize external objects on surface 60 is shown in FIG. 3. As shown in FIG. 3, circuitry 34 may include an inverter such as inverter 72 or other drive circuit that produces wireless power signals that are transmitted through an output circuit that includes one or more coils 36. A single coil 36 is shown in the example of FIG. 2. In general, device 12 may have any suitable number of coils 36 (1-100, more than 5, more than 10, fewer than 40, fewer than 30, 5-25, etc.). Switching circuitry MX (sometimes referred to as multiplexer circuitry) that is controlled by control circuitry 42 can be located before and/or after each coil 36 and/or before and/or after the other components of output circuit 71 and can be used to switch desired sets of one or more coils 36 (desired output circuits 71) into or out of use. For example, if it is determined that object 62 of FIG. 2 is a wireless power receiving device 10 and object 64 is an incompatible foreign object such as a coin, the coils overlapping object 62 may be activated during wireless power transmission operations and the coils under object 64 may be deactivated so that these coils do not transmit wireless power. Other coils 36 (e.g., coils not overlapped by object 64 in this example) can also be turned off during wireless power transmission operations, if desired.

With continued reference to FIG. 3, during wireless power transmission operations, transistors 74 of inverter 72 are driven by time-varying control signals from control circuitry 42. Control circuitry 42 may also use transistors 74 of inverter 72 to apply square wave pulses or other impulses to coil 36 (e.g., during impulse response measurements). If desired, a capacitor such as capacitor C2 may be placed at the output of inverter 72 to smooth the square wave pulses. The value of C2 may be, for example, 4.7 nF, more than 2 nF, less than 6 nF or other suitable smoothing capacitance value.

Coil 36 (e.g., a coil that has been selected using multiplexing circuitry MX) has an inductance L. Capacitor 96 has a capacitance C1 that is coupled in series with inductance L in output circuit 90. When supplied with alternating-current drive signals from inverter 72 while switch (transistor) TP is closed, the output circuit formed from coil 36 and capacitor 96 produces alternating-current electromagnetic fields that are received by one or more coils 14 in device 10. The inductance L of each coil 36 is influenced by magnetic coupling with external objects, so measurements of inductance L for one or more of coils 36 in device 12 at various frequencies can reveal information on objects on charging surface 60.

To conserve power, device 12 may be operated in a standby mode while awaiting use to supply wireless power to devices 10. The signal measurement circuitry of FIG. 3 (sometimes referred to as output circuit signal measurement circuitry, external or foreign object detection circuitry, etc.) monitors for the presence of external objects during standby. The power consumption of the measurement circuitry in transmitter circuitry 34 during standby operations may be less than 50 mW, less than 200 mW, more than 1 mW, or other suitable value.

In standby mode, device 12 periodically scans coils 36 (e.g., device 12 scans each of coils 36) for the presence of external objects (e.g., devices 10, foreign objects such as coins, etc.). To probe a selected coil for changes in inductance L due to external objects, a probe signal is driven onto node N1 with oscillator circuitry 84 while control circuitry 42 turns off inverter 72 (e.g., transistors 74 are not used to drive signals onto node N2). Control circuitry 42 uses, for example, oscillator circuitry 84 (e.g., one or more voltage controlled oscillators, one or more other adjustable oscillators, and/or other oscillatory circuitry) to produce an alternating-current probe signal (e.g., a sine wave, square wave, etc.) at a probe frequency fr (e.g., 4 MHz or other suitable frequency such as a frequency of at least 500 kHz, at least 1 MHz, at least 2 MHz, less than 10 MHz, between 1 MHz and 10 MHz, or other suitable frequency). The probe frequency (oscillator output frequency) fr that is used during standby mode is a frequency that differs from RFID frequencies such as 13.56 MHz and that differs from the normal alternating-current frequency supplied to output circuit 71 by inverter 72 during wireless charging operations, which may be, for example, 100-500 kHz, more than 50 kHz, more than 100 kHz, more than 200 kHz, less than 450 kHz, less than 400 kHz, less than 300 kHz, or other suitable wireless power alternating-current drive frequency.

The signal at frequency fr is applied to node N1 from oscillator circuitry 84 via impedance injection network 132 and capacitor 86 and is coupled to coil 36 via capacitor 96. Inverter 72 may be on or may be held in an off state by control circuitry 42. With one illustrative configuration, control circuitry 42 may help transistor T2 on and transistor T1 off. Impedance injection network 132 has an impedance that helps oscillator 84 effectively inject alternating-current signals (e.g., probe signals at one or more frequencies or a swept frequency signal) onto node N1 for detection by measurement circuitry such as measurement circuit 78 and measurement circuit 84 of FIG. 3. Control circuitry 42 controls multiplexer(s) MX to select the coil to which the signal at frequency fr is applied (e.g., coil 36 of FIG. 3) from the array of coils 36 of device 12 shown in FIG. 2. Capacitance C1 may have a value of 150 μF, more than 10 μF, less than 1000 μF, or other suitable value. Transistor TP may have a parasitic capacitance Cp (e.g., a parasitic capacitance of 85 pF, more than 10 pF, less than 800 pF, or other suitable value) when open.

With one illustrative configuration, direct-current voltage source 130 applies a 20 V direct-current bias voltage to node N1 when transistor TP is open, which reduces parasitic capacitance Cp of transistor TP from about 150 pF to about 85 pF (as an example). For standby operations, control circuitry 42 opens transistor TP so that so that oscillator output signals from oscillator 84 are routed through coil 36. As described more fully in connection with the equivalent circuit of FIG. 7, when transistor TP is open, the presence of low parasitic capacitance Cp helps reduce the capacitance in parallel with coil 36 and reduces the potential negative impact of the potentially large parasitic capacitances of transistors T1 and T2 (e.g., 150 pF or more) and smoothing capacitor C2 (e.g., 4.7 nF, more than 2 nF, less than 6 nF or other suitable smoothing capacitance value) on the detection sensitivity of measurement circuits 78 and 94 (e.g., signal attenuation on node N1 will be avoided). This allows transistors T1 and T2 to be optimized for use in inverter 74 (e.g., the parasitic capacitances of field-effect transistors T1 and T2 can be large when lowering drain-source "on resistance" Rds-on to optimize field-effect transistors T1 and T2 for power transfer applications) and allows smoothing capacitor C2 to be used at the output of inverter 74.

With TP open, output circuit 71 (coil 36 in series with C1 and Cp) will be characterized by a resonance at frequency fres of equation 1.

$$fres=1/(2\pi(LCp)^{1/2}) \quad (1)$$

Figure 4:
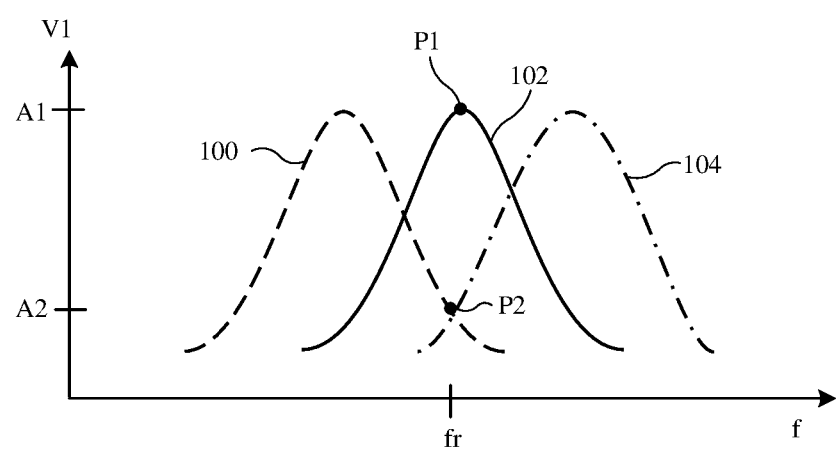
FIG. 4 is a graph showing the response of various illustrative objects on the surface of a wireless power transmitting device in accordance with an embodiment.

The expected measured signal at node N1 (output voltage V1) as a function of applied signal frequency f in the absence of external objects on coil 36 is given by curve 102 of FIG. 4. In the presence of an electronic device such as device 10 that contains one or more coils 14 overlapping coil 36, curve 102 may shift to lower frequencies as shown by curve 100. In the presence of a coin or other incompatible foreign object overlapping coil 36, curve 102 may shift to higher frequencies as shown by curve 104. Changes in load can be detected by monitoring the value of V1 using measurement circuit 78 of FIG. 3 at one or more probe frequencies. For example, oscillator circuitry 84 may be used to apply a probe signal to node N1 at a frequency fr that has been chosen to match resonant frequency fres of equation 1. If desired, multiple probe signals may be applied to output circuit 72 while using measurement circuitry to evaluate the resulting signal on node N1. For example, the direction of change in curve 102 (shifting higher or lower) can be detected by taking multiple measurements of V1 at two or more frequencies near frequency fr of FIG. 4).

To make measurements of V1, measurement circuit 78 includes peak detector 80 and analog-to-digital converter 82. Circuit 78 measures the signal at node N1 and supplies a corresponding digital version of this signal to control circuitry 42. In the presence of an object overlapping coil 36 (whether from device 10, a sensitive RFID device, or a coin or other incompatible foreign object), signal V1 will drop. For example, the signal on node N1 may drop from a value of P1 (e.g., a peak value associated with curve 102) when coil 36 is unloaded to a reduced value of P2 when coil 36 is loaded due to the presence of an external object (e.g., a reduced value P2 associated with shifted curve 100 from an overlapping wireless power receiving device with a coil or a reduced value P2 associated with shifted curve 102 from an overlapping coin).

During standby operations, control circuitry 42 can scan through coils 36 by using multiplexer circuitry MX or other switching circuitry in circuitry 34. In some embodiments, this sequentially couples each of coils 36 to node N1 while circuitry 78 measures signal V1 for each selected coil 36. If no changes in signal V1 are detected, control circuitry 42 can conclude that no objects are present on device 12 (e.g., no objects are resting on charging surface 60). If a change in V1 is detected, control circuitry 42 performs additional operations to confirm that device 10 is present rather than an incompatible foreign object such as a coin.

With one illustrative approach, control circuitry 42 uses impulse response measurement circuitry 76 (sometimes referred to as inductance measurement circuitry and/or Q factor measurement circuitry) to perform low-frequency measurements of inductance L and quality factor Q in response to detection of a load on one or more coils 36 during standby. During impulse response measurements, control circuitry 42 directs inverter 72 to supply one or more excitation pulses (impulses) to coil 36 while turning on transistor TP, so that L and C1 in output circuit 71 form a resonant circuit (e.g., a circuit where resonant current passes through T2, which can be turned on). The impulses may be, for example, square wave pulses of 1 µs in duration. Longer or shorter pulses may be applied, if desired. The resonant circuit may resonate at a frequency near to the normal wireless charging frequency of coil 36 (e.g., about 320 kHz, 100-500 kHz, more than 50 kHz, more than 100 kHz, more than 200 kHz, less than 450 kHz, less than 400 kHz, less than 300 kHz, or other suitable wireless charging frequency).

Figure 5:
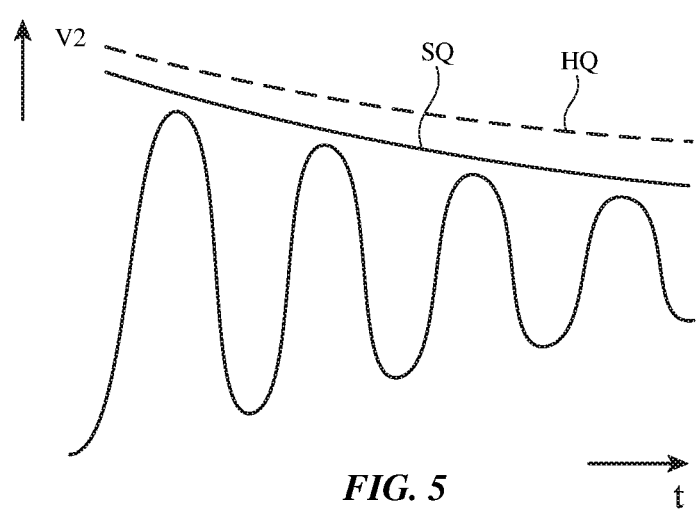
FIG. 5 is a graph of an illustrative impulse response of the type that may be used to characterize objects on a wireless power transmitting device in accordance with an embodiment.

The impulse response (voltage signal V2 on node N1) of circuit 71 to the applied pulse(s) is as shown in FIG. 5. The frequency of the impulse response signal of FIG. 5 is proportional to 1/sqrt(LC), so L can be obtained from the known value of C1 and the measured frequency of the impulse response signal. Q may be derived from L and the measured decay of the impulse response signal. As shown in FIG. 5, if signal V2 decays slowly, Q is high (e.g., HQ) and if signal V2 decays more rapidly, Q is low (e.g., SQ). Measurement of the decay envelope of V2 and frequency of V2 of the impulse response signal of FIG. 5 with circuitry 76 will therefore allow control circuitry 42 to determine Q and L.

If the measured value of L for a given coil matches the normal L value expected for each of coils 36 in the array of coils 36 overlapping surface 60 (e.g., when the measured L value is not influenced by the presence device 10 or other external object on surface 60), control circuitry 42 can conclude that no external object suitable for wireless charging is present. If a given measured value of L is larger than that expected for an unloaded coil, control circuitry 42 can conclude that an external object is present that appears to be in an appropriate condition for wireless charging and can perform additional measurement operations. For example, control circuitry 42 can perform a swept-frequency measurement (sometimes referred to as an RFID checking measurement) on node N1 to check whether a sensitive device such as an RFID device is present on surface 60.

The measurements made by circuitry 76 are performed on one or more of coils 36 (e.g., these measurements may be performed on each of coils 36 in the array of coils in device 12). Circuitry 42 uses these impulse response measurements to identify spatial patterns in measured L values (and/or Q factor values) across surface 60. Analysis of a pattern of measured inductance (L) change can help determine whether a known type of device 10 is present on coils 36. Analysis of the spatial patterns of measured inductance L (and, if desired, Q factor, which has an inverse relationship with respect to L), as a function of coil position in the X-Y plane of surface 60 may be used in determining when to transit wireless power from device 12 to device 10. If, for example, the value of L for each of coils 36 is unchanged from its nominal state, circuitry 42 can conclude that no external device suitable for wireless charging is present. If the value of L for a given one of coils 36 is elevated or other suitable pattern of measured L values is detected, circuitry 42 can conclude that an external device that is suitable for wireless charging is present on that coil and can prepare to transmit wireless power using that coil.

Before transmitting wireless power, it may be desirable to check whether a sensitive device such as an RFID device is present on surface 60. Sensitive devices can potentially be harmed by excessive wireless power levels, so checking for sensitive devices helps avoid damage to sensitive devices during subsequent wireless power transfer operations. In some scenarios, both portable device 10 and a sensitive device may be present over the same coil 36 in the array of coils 36 in device 12. A sensitive device may, as an example, be present under a cellular telephone, watch, or other portable device 10 that includes a wireless power receiving coil 14. Even though the presence of the portable device 10 can be detected by making inductance measurements with coils 36, it is desirable to check whether a sensitive device is also present so as to avoid damaging the sensitive device by exposure to wireless power transmissions.

Radio-frequency identification (RFID) devices typically have RFID coil circuits that resonate at relatively high frequencies such as a frequency of 13.56 MHz. In some embodiments, to determine if an RFID is present on surface 60, RFID checking measurements are performed by measuring a voltage signal V3 on node N1 using measurement circuit 94 (FIG. 3). During these checking measurements, control circuitry 42 directs oscillator circuitry 84 to sweep the frequency of the signal supplied to node N1 between a first frequency f1 and a second frequency f2 covering the expected resonant frequencies of popular RFID coils. Transistor TP may remain open so that current from oscillator circuitry 84 flows through each coil 36 that has been selected during measurement operations. The value of f1 may be, for example, 10 MHz, more than 5 MHz, less than 11 MHz, less than 12 MHz, less than 15 MHz, or other suitable value. The value of f2 may be 30 MHz, more than 14 MHz, more than 15 MHz, more than 20 MHz, less than 45 MHz, or other suitable value.

As shown in FIG. 3, swept-frequency measurement circuit 94 includes a peak detector such as peak detector 88 that measures the voltage on node N1, band pass filter 90, and analog-to-digital converter circuitry 92. Analog-to-digital converter circuitry 92 supplies a digital version of its input to control circuitry 42.

Figure 6:
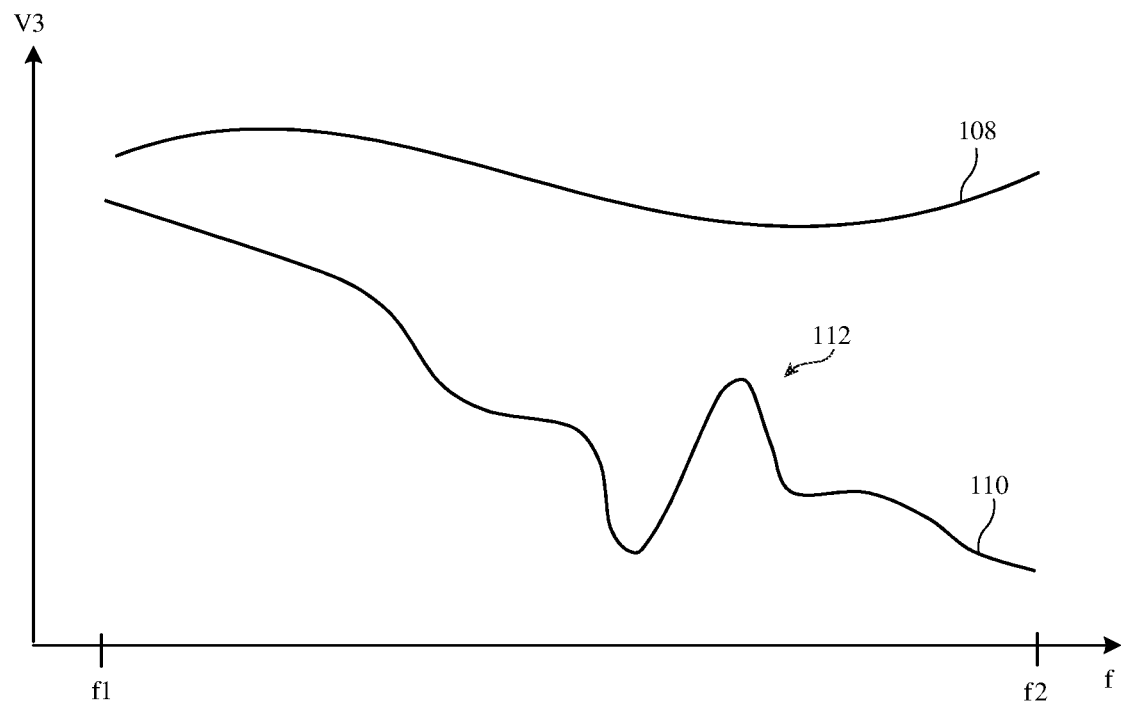
FIG. 6 is a graph showing output signal traces of the type that may be associated with placing a sensitive object such as a radio-frequency identification device on the surface of a wireless power transmitting device in accordance with an embodiment.
Figure 6:
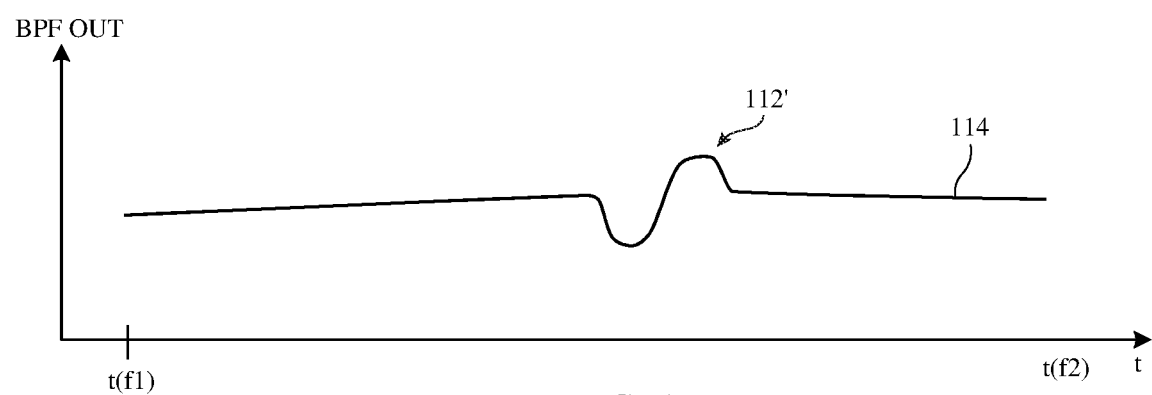

When no RFID device is present on charging surface 60 of device 12, peak detector 88 will detect a signal such as the signal of curve 108 in FIG. 6. When an RFID device overlaps charging surface 60, signal V3 (see, e.g., curve 110) will exhibit a resonance signal such as signal 112 in as frequency f is swept between f1 and f2. Resonance signal 112 may, for example, correspond to a resonance frequency such as an RFID resonant frequency of 13.56 MHz.

Frequency f is swept between f1 and f2 at a predetermined speed. For example, control circuitry 42 may sweep frequency from f1 to f2 in an interval of 2 ms, at least 1 ms, less than 3 ms, or other suitable time period. The pass frequency of band pass filter 90 is selected so that resonance signal 112 will pass through band pass filter 90 as band pass filtered signal 112' of band pass output curve 114 when frequency f is changed between f1 and f2 at the predetermined speed (e.g., when the full sweep range is covered in an interval of 2 ms, etc.). The use of band pass filter 90 helps remove non-resonant signal fluctuations from curve 110 (e.g., signal tilt and slowly varying increases and/or decreases of the type shown by illustrative curve 110 of FIG. 6). The resulting band-pass-filtered signal (curve 114 and filtered signal resonance 112') can be processed by control circuitry 42 to confirm that an RFID resonance at a particular frequency has been detected. Control circuitry 42 can then take appropriate action. For example, if no RFID signature is detected, control circuitry 42 can conclude that the detected external object on surface 60 is likely a portable device (device 10 with coil 14) without any intervening (overlapping) sensitive RFID device. If an RFID signature (e.g., resonant signal 112' at an RFID frequency such as 13.56 MHz) is detected, control circuitry 42 can reduce the level of wireless power transmitted by coils 36 or can prevent wireless power from being transmitted by coils 36 (or at least the coils that are overlapped by the sensitive RFID device) so as to mitigate damage to the RFID device. Optionally, control circuit 42 can issue an alert to a user.

Figure 7:
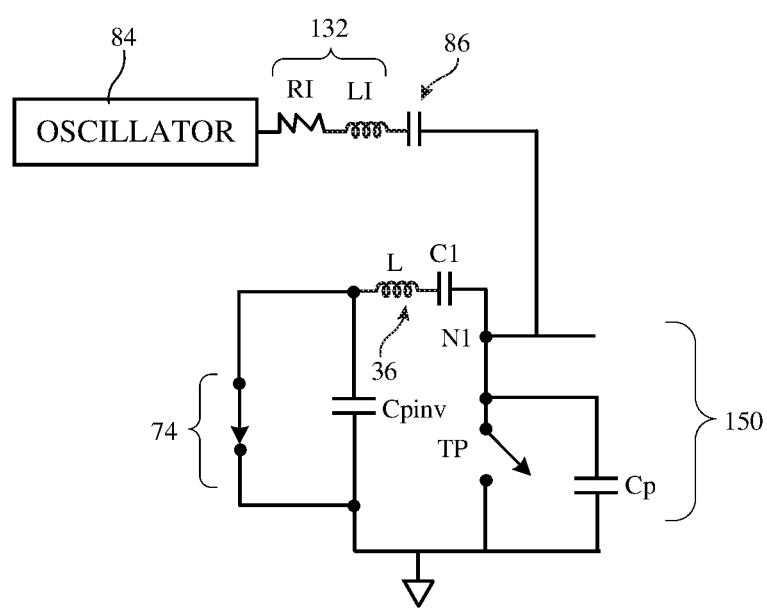
FIG. 7 is an equivalent circuit of a portion of an illustrative wireless power transmitting device in accordance with an embodiment.

FIG. 7 is an equivalent circuit for the circuitry of FIG. 3 during signal measurement operations with circuits 78 and 94. In this situation, transistor TP is open and exhibits parasitic capacitance Cp. Due to the presence of the 20 V bias from bias circuit 130, transistor TP exhibits a relatively low value of parasitic capacitance (e.g., Cp may be about 85 pF). Cpinv represents the capacitance of smoothing capacitor C2 (e.g., 4.7 nF, more than 2 nF, less than 6 nF or other suitable smoothing capacitance value) in parallel with the parasitic capacitances of transistors T1 and T2 (e.g., 150 pF each) and may have a value of about 5 nF (as an example). The presence of parasitic capacitance Cp lowers the capacitance in parallel with coil 36, which is being used to detect objects on surface 60 and thereby enhances detection sensitivity.

Impedance injection network 132 and capacitor 86 are coupled between oscillator 84 and coil 36. Impedance injection network 132 includes resistor RI in series with inductor LI. Inductor LI provides network 132 with inductance that helps enhance measurement sensitivity. The impedance of circuitry 150 is mostly capacitive, so impedance injection network 132 is mostly inductive to effectively match network 132 to the impedance of circuitry 150. This amplifies the response detected by detection circuits 94 and 78 at node N1. Network 132 flattens the response of node N1 as oscillator 84 sweeps frequency f between frequencies f1 and f2 while gathering response curve 114 of FIG. 6, so that signal 114 can be uniformly amplified at frequencies between f1 and f2. Resistor RI helps balance the impedance of network 132 over the range of frequencies f1 to f2. With one illustrative configuration, resistor RI may have a value of 25 ohms (e.g., at least 10 ohms, less than 75 ohms, etc.), inductor LI may have an inductance of 100 nH (at least 10 nH, less than 1000 nH), and capacitor 86 may have a value of 2.2 nF (e.g., at least 0.2 nF, less than 200 nF, etc.).

Figure 8:
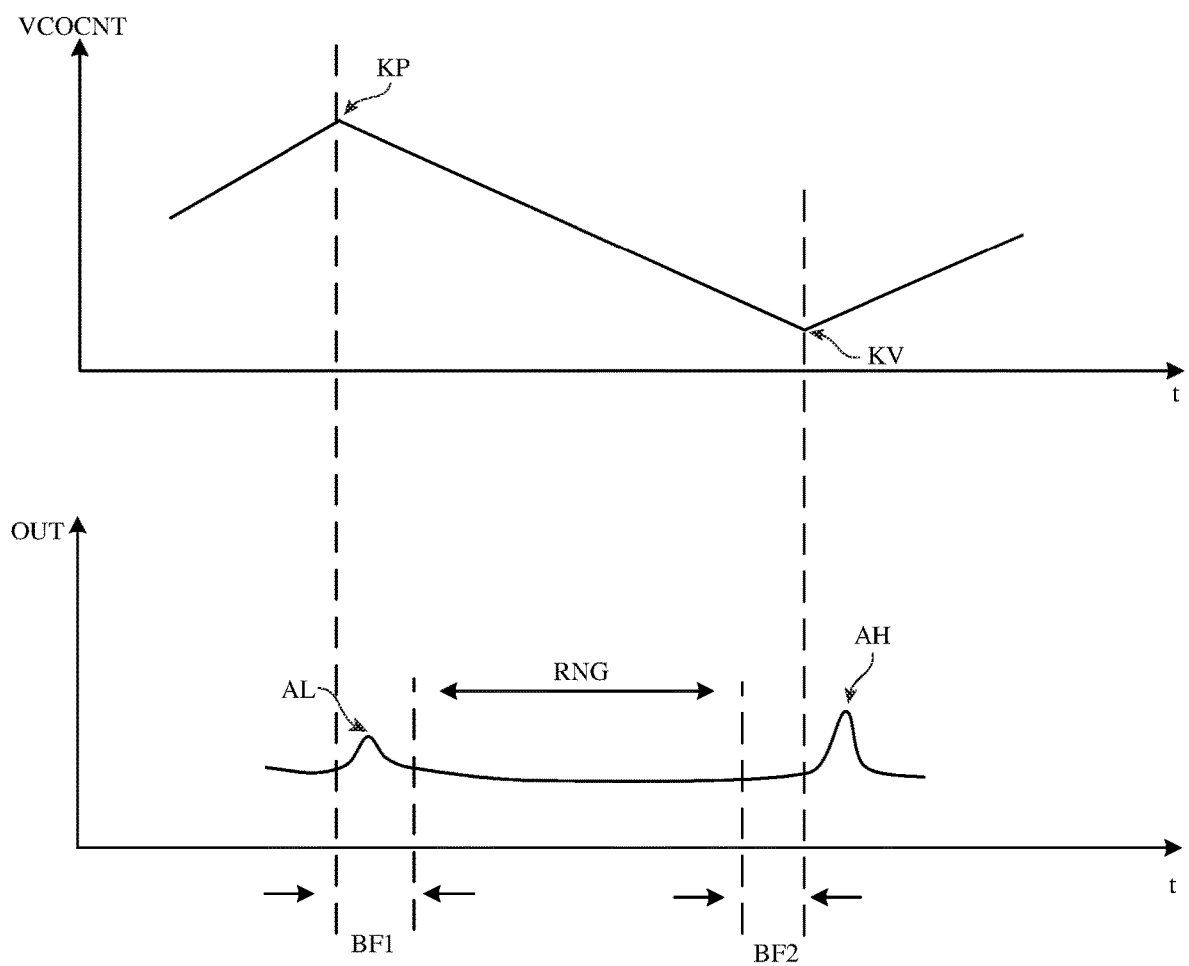
FIG. 8 is a graph having a trace of illustrative oscillator control signals and a trace of illustrative oscillator output signals in accordance with an embodiment.

Oscillator 84 includes oscillator circuitry such as one or more voltage controlled oscillators. During frequency sweeping operations with oscillator 84, control circuitry 42 supplies oscillator 84 with control signal VCOCNT (FIG. 3). The magnitude of control signal VCOCNT controls the output frequency from oscillator 84 that is supplied to impedance injection network. As shown in the upper trace of FIG. 8, the signal VCOCNT produced by control circuitry 42 has a sawtooth shape. The resulting magnitude of the output OUT of oscillator 84 as a function of time is shown in the lower trace of FIG. 8. Each time there is a knee in signal VCOCNT, an artifact (rise in output magnitude OUT) is produced at the output of oscillator 84. For example, when sawtooth signal VCOCNT reaches a peak (see, e.g., knee KP) because the output frequency f of oscillator 84 has reached a peak and is being decreased, an artifact such as artifact AL is produced. When sawtooth signal VCOCNT reaches a valley (see, e.g., knee KV) because the output frequency f of oscillator 84 has reached a valley and is being increased, an artifact such as artifact AH is produced, which can potentially decrease measurement accuracy.

It has been determined that the size of artifact AH is generally larger than the size of artifact AL, so control circuitry can minimize inaccuracies by gathering measurements with measurement circuit 94 while frequency f is being swept from high (e.g., a frequency near frequency f2 when VCOCNT is at knee KP) to low (e.g., a frequency near frequency f1, which is lower than f2, when VCOCNT is at knee KV). Accuracy is further improved by providing buffer ranges BF1 and BF2 at opposing ends of the swept frequency range. To provide buffers BF1 and BF2, control circuitry 42 sweeps than the size of VCOCNT over a wider range than needed to change frequency f from f2 to f1. In particular, VCOCNT is varied from a value above that necessary to produce frequency f2 to a value below that necessary to produce frequency f1 and measurement circuit 94 is only used to gather data during central time period RNG (e.g., when frequency f varies from f2 to f1). By gathering output from circuit 94 only when oscillator 84 is operated in range RNG (frequency f2 to f1), artifacts AL and AH are avoided and accuracy is enhanced.

Figure 9:
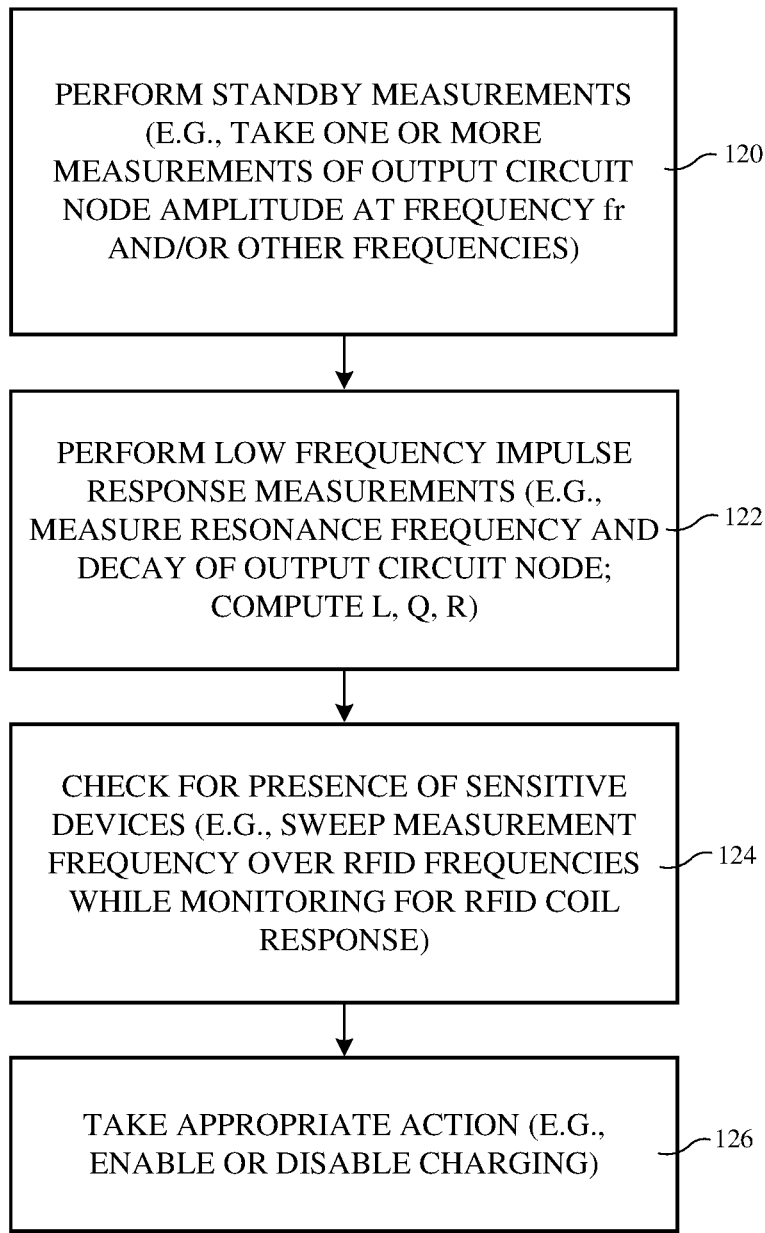
FIG. 9 is a flow chart of illustrative operations involved in operating a wireless power transfer system such as the wireless charging system of FIG. 1 in accordance with an embodiment.

FIG. 9 is a flow chart of illustrative operations involved in using system 8. During the operations of block 120, system 8 performs standby measurements. For example, device 12 may use circuitry such as circuit 78 of FIG. 3 to monitor one or more of coils 36 (e.g., each coil 36 in the array of coils 36 in device 12) for the presence of an external object such as one of devices 10 which is potentially compatible for wireless power transfer or an incompatible object such as a coin or badge. A single measurement at frequency fr may be made to determine whether V1 is lower than expected for any coils 36 or, if desired, multiple measurements at different frequencies near fr may be made (e.g., to determine which direction the coil resonance has shifted due to an external object and thereby help determine whether the object is an electronic device or is a coin or other incompatible foreign object). The standby operations of block 120 consume a low amount of power (e.g., 50 mW or less, 100 mW or less, more than 1 mW, or other suitable amount). During standby operations, transistor TP is opened to help decrease the capacitance in parallel with coil 36 and thereby enhance measurement sensitivity, as described in connection with FIG. 7.

In response to detection of an external object with control circuitry 42 during the operations of block 120, control circuitry 42 performs additional detection operations such as low-frequency impulse response measurements (block 122). During the operations of block 122, control circuitry 42 may, for example, use inverter 72 or other resonant circuit drive circuitry to apply a stimulus (e.g., a square wave or other signal impulse) to the circuit formed from one or more of coils 36 (e.g., to each coil 36 in the array of coils 36 in device 12, a subset of these coils such as those for which foreign object presence has been detected during the operations of block 120, and/or other suitable sets of one or more of coils 36), thereby causing that circuit (and that coil 36) to resonate while using a measurement circuit such as impulse response measurement circuitry 76 of FIG. 3 to measure the response of the resonant circuit. As described in connection with FIG. 5, the characteristics of the resulting circuit resonance may then be measured and analyzed. For example, control circuitry 42 may use information on the measured resonant frequency to measure inductance and may use information on the decay of the signal resonance to determine resistance R and Q factor. If desired, the measurements of blocks 120 and/or 122 can be mapped in dimensions X and Y across surface 60 to help identify devices 10 and foreign objects.

If the operations of block 122 reveal that a compatible electronic device 10 is present, additional checking operations may be performed during block 124 to detect whether foreign objects such as radio-frequency identification devices are present. In particular, frequency sweep measurements with circuitry such as oscillator circuitry 84 and swept-frequency measurement circuit 94 of FIG. 3 may be performed to check for the presence of a sensitive RFID device, as described in connection with FIG. 6. While making frequency sweeping measurements, control circuitry 42 gathers measurements with circuit 94 during periods of sawtooth control signal VCOCNT in which VCOCNT is decreasing (frequency is decreasing) but not increasing and gathers measurements in middle range RNG but not during buffer periods BF1 and BF2 at the beginning and end of each of these periods. Impedance injection network 132 helps flatten the frequency response of node N1 during frequency sweep measurements with oscillator 84 and measurement circuit 94.

Appropriate action are taken during the operations of block 126 based on the results of measurements such as the measurements of blocks 120, 122, and/or 124. If, as an example, a sensitive RFID device is detected during the operations of block 124 or if a foreign object is detected, wireless charging operations with all of coils 36 or an appropriate subset of coils 36 can be blocked. In response to detection of an electronic device 10 having a known characteristic L response (and/or Q response) and in response to determining that no RFID device is present after checking one or more of coils 36, as appropriate, with circuit 94 (e.g., the coils 36 for which L and/or Q measurements and/or other measurements indicate may be overlapped by an object or all of coils 36), control circuitry 42 can use wireless power transmitting circuitry 34 to transmit wireless power to wireless power receiving circuitry 46.

As the foregoing demonstrates, a series switch TP and a matching network (impedance injection 132 plus capacitor 86 of FIG. 3) may be used to allow oscillator 84 to drive a signal into the drive circuitry (circuitry 34) at a much higher frequency than it is tuned for. The placement of switch TP in series with the coil 36 and its tuning network allows the tuning network to be effectively broken when seeking to drive higher frequency oscillator signals into the coil. So when it is desired to drive coil 36 with inverter 72, the switch is shorted and when it is desired to drive a high frequency signal into coil 36, the switch is opened. As a result, tuning capacitor C1 does not interfere with high frequency signals from oscillator 84. The injection impedance inductance allows more current to be driven into the coil at frequencies of interest (e.g., higher frequencies). This increase in current results in additional signal response during measurements. The probe frequency (e.g., a single frequency from oscillator 84) may be used to determine whether an object has been placed on charging surface 60 by measuring V1 at N1 (or other suitable node) to detect impedance changes in the system.

During RFID detection operations, the frequency may be swept across a band of interest (e.g., a frequency band associated with potential RFID resonant objects), thereby generating an impedance profile (signature) to compare with known profiles to whether unexpected objects are present on charging surface 60. Voltage V3 may be measured at node N1 or other suitable node to generate the profile. The swept frequency may be swept up or down depending on circuit parameters in order to minimize knee response artifacts. Bandpass filter 90 may have its pass band tailored to the speed of the frequency sweep in order to remove non-resonant responses in the measurement circuitry.

In general, impulse response measurements and RFID detection measurements can be performed in any suitable order. With one illustrative configuration, the RFID detection system is used before the impulse response measurements are made to prevent the impulse detection system from damaging RFID devices.

The RFID detection circuitry (84, 132, 88, 90, 92, 78, etc.) can be connected at other nodes, such as N2 or MX. Similarly, impulse response circuitry 76 can be connected at different nodes. If desired, the RFID detection circuitry and impulse response circuitry be connected to the same node, as these circuits do not interfere with each other.

Figure 10:
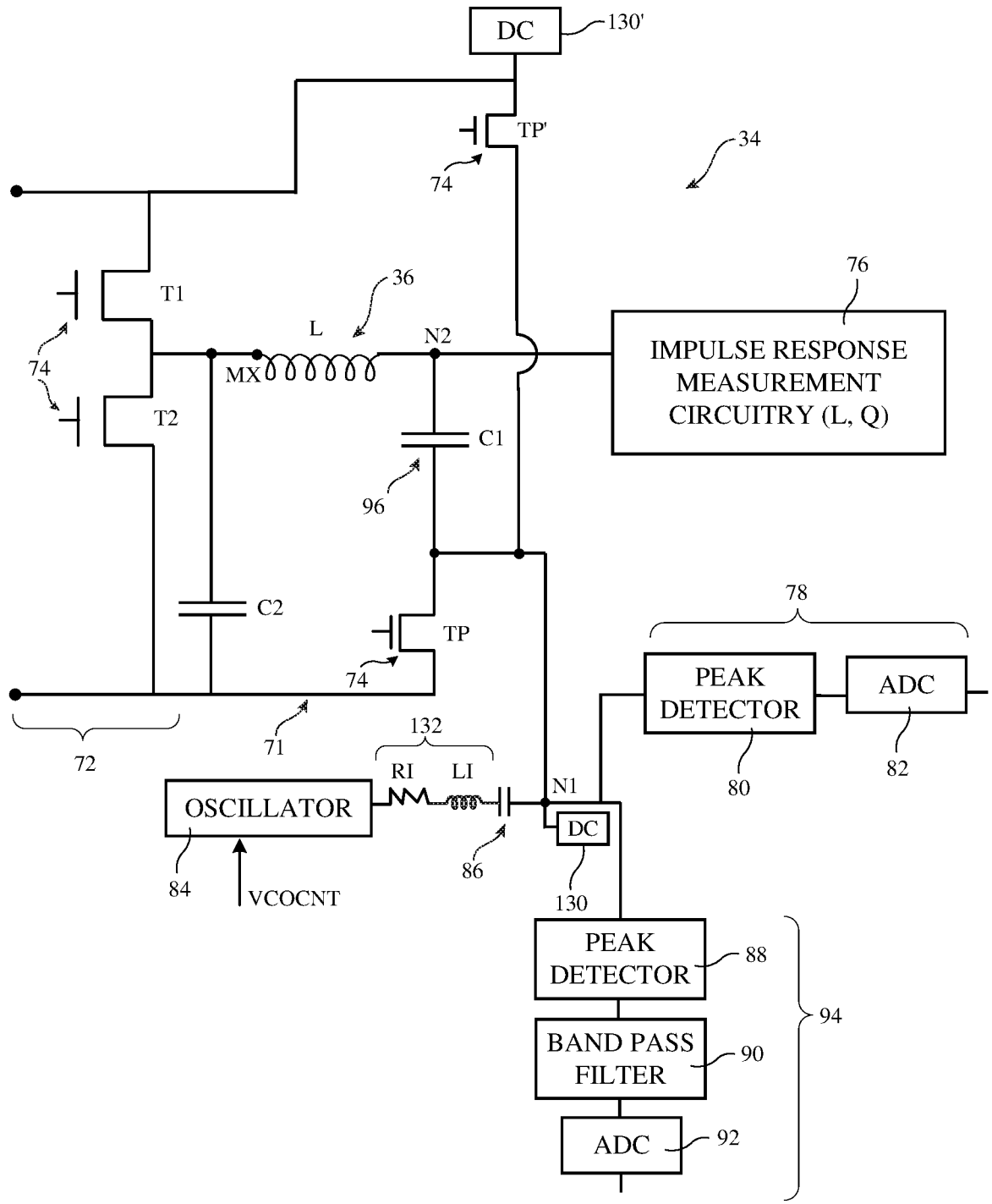
FIG. 10 is a circuit diagram of illustrative wireless power transmitting circuitry with a full bridge invertor and output circuit signal measurement circuitry in a wireless power transmitting device in accordance with an embodiment.

In the example of FIG. 3, inverter 74 of circuitry wireless power transmitting circuitry 34 has two transistors (T1 and T2) in a half bridge inverter configuration. If desired, invertor 74 of wireless power transmitting circuitry 34 may have four transistors in a full bridge inverter configuration. This type of arrangement is shown in FIG. 10. As shown in FIG. 10, inverter 74 is a full bridge inverter that includes transistors T1, T2, TP, and TP'. By using a full bridge arrangement rather than a half bridge arrangement, the peak-to-peak voltage of the drive signals for coil 36 can be increased for a given DC power supply voltage. For example, if the DC power supply of circuitry 34 is 20V, a half bridge inverter can drive signals of 20V peak-to-peak into coil 36, whereas a full bridge inverter can drive signals of 40V peak-to-peak into coil 36. Full bridge arrangements for inverter 74 can be used in embodiments in which circuitry 34 include multiple coils 36 or in embodiments in which multiplexer MX is omitted and circuitry 34 includes only a single coil 36.

To avoid shunting current through transistors TP' and TP during wireless power transmission operations, transistors TP' and TP can be provided with direct-current bias from direct-current voltage sources 130' and 130, respectively. If, as an example, the DC power supply of circuitry 34 is 20V, source 130' can supply a 20V output and source 130 can supply a 10V output. In this scenario, there will be a 10 V bias across transistor TP' and a 10V bias across transistor TP. In general, any suitable levels of bias may be supplied to transistors TP' and TP. The use of 10V biases is illustrative.

Transistors TP' and TP may be metal-oxide-semiconductor field-effect transistors (MOSFETs). By DC biasing transistors TP' and TP, the parasitic capacitances of transistors TP' and TP can be reduced. This reduces the potential for drive signals to shunt through transistors TP' and TP rather than flowing through coil 36 and thereby helps to enhance power transmission efficiency during wireless power transmission operations.

When it is desired to transmit power in a wireless power transmission mode with circuitry 34 of FIG. 10, control circuitry 42 supplies control signals to the gates of transistors T1, T2, TP', and TP to create the drive signal through coil 36. When it is desired to use output circuit signal measurement circuitry to monitor for foreign objects, RFID devices, coil impedances, etc. (e.g., when it is desired to make measurements with circuitry 84, 132, 86, 94, 78, 76, etc. in a measurement mode), control circuitry 42 opens transistors TP', TP, and T1 (and optionally transistor T2).

Consider, as an example, a scenario in which it is desired to make RFID measurements using oscillator 84 and measurement circuitry 94. As described in connection with FIG. 3, turning off transistor TP (and, in the current scenario, turning off transistors T1, T2, and TP') during these measurements ensures that oscillator output signals from oscillator 84 are routed through coil 36. As a result, tuning capacitor C1 does not interfere with high frequency signals from oscillator 84 and measurements may be make satisfactorily to determine whether an RFID device is present.

The foregoing is merely illustrative and various modifications can be made to the described embodiments. The foregoing embodiments may be implemented individually or in any combination.

What is claimed is:

1. A wireless power transmitting device with a charging surface configured to receive a wireless power receiving device that has a wireless power receiving coil, the wireless power transmitting device comprising:

a coil;

wireless power transmitting circuitry coupled to the coil and configured to transmit wireless power signals to the wireless power receiving device with the coil, wherein the wireless power transmitting circuitry comprises:

an output circuit that includes the coil and a transistor coupled in series with the coil, oscillator circuitry, an impedance injection network coupled between the oscillator circuitry and the output circuit, a first type of object detection measurement circuit coupled to a node between the transistor and the coil;

a second type of object detection measurement circuit, different than the first type of object detection measurement circuit, coupled to the node;

an inverter coupled to an input of the output circuit; and control circuitry configured to:

open the transistor in the output circuit when making measurements with the first type of object detection measurement circuit and the second type of object detection measurement circuit; and close the transistor in the output circuit when transmitting the wireless power signals to the wireless power receiving coil.

2. The wireless power transmitting device defined in claim 1 wherein the impedance injection network includes an inductor coupled between the oscillator and the output circuit.

3. The wireless power transmitting device defined in claim 2 wherein the control circuitry is configured to control transmission of wireless power to the wireless power receiving device with the wireless power transmitting circuitry based at least partly on information from the first or second type of object detection measurement circuit and wherein the first type of object detection measurement circuit includes measurement circuitry configured to measure signals in the output circuit while the oscillator circuitry produces output at a probe frequency.

4. The wireless power transmitting device defined in claim 2 wherein the second type of object detection measurement circuit includes measurement circuitry configured to measure signals in the output circuit while the oscillator circuitry produces a frequency-swept output ranging from a first frequency to a second frequency.

5. The wireless power transmitting device defined in claim 2 wherein the first type of object detection measurement circuit is configured to measure signals in the output circuit while the oscillator circuitry produces output at a probe frequency and wherein the second type of object detection measurement circuit is configured to measure signals in the output circuit while the oscillator circuitry produces a frequency-swept output ranging from a first frequency to a second frequency.

6. The wireless power transmitting device defined in claim 2 wherein the impedance injection network includes a resistor coupled in series with the inductor.

7. The wireless power transmitting device defined in claim 2 wherein the impedance injection network is coupled to a node in the output circuit that is between the coil and the transistor.

8. The wireless power transmitting device defined in claim 7 wherein the inverter has first and second transistors coupled in series and wherein the coil is coupled between the inverter and the node.

9. The wireless power transmitting device defined in claim 8 further comprising a direct-current voltage source configured to apply a direct-current bias voltage to the transistor when the transistor is open.

10. The wireless power transmitting device defined in claim 9 wherein the first type of object detection measurement circuit is configured to measure signals in the output circuit while the oscillator circuitry produces output at a probe frequency wherein the second type of object detection measurement circuit is configured to measure signals in the output circuit while the oscillator circuitry produces a frequency-swept output ranging from a first frequency to a second frequency.

11. The wireless power transmitting device defined in claim 10 further comprising an impulse response measurement circuit coupled to an additional node different than the node and configured to measure a response of the output circuit to an impulse signal that is supplied to the coil by the control circuitry using the inverter, wherein the control circuitry is configured to measure an inductance associated with the coil using the impulse response measurement circuit.

12. The wireless power transmitting device of claim 1 further comprising a capacitor coupled in series between the transistor and the coil.

13. A wireless power transmitting device configured to transmit power wirelessly to a wireless power receiving device, the wireless power transmitting device comprising:
an output circuit having at least one wireless power transmitting coil and a transistor coupled in series with the wireless power transmitting coil;
control circuitry configured to open and close the transistor;
an inverter that is coupled to an input of the output circuit and that is configured to transmit wireless power signals to the wireless power receiving device with the wireless power transmitting coil when the transistor is closed by the control circuitry;
oscillator circuitry coupled to the output circuit;
a first type of object detection measurement circuit coupled to a first node between the transistor and the wireless power transmitting coil and configured to measure signals in the output circuit while the oscillator applies a frequency-swept signal to the output circuit ranging from a first frequency to a second frequency when the transistor is opened by the control circuitry; and
a second type of object detection measurement circuit coupled to a second node different than the first node and configured to measure a response of the output circuit to an impulse signal that is supplied to the wireless power transmitting coil by the control circuitry using the inverter when the transistor is closed by the control circuitry.

14. The wireless power transmitting device defined in claim 13 further comprising a third type of object detection measurement circuit configured to measure signals in the output circuit while the oscillator circuitry produces output at a probe frequency and while the transistor is opened by the control circuitry.

15. The wireless power transmitting device defined in claim 14 further comprising an inductor coupled between the oscillator and the output circuit.

16. The wireless power transmitting device defined in claim 15 further comprising a direct-current voltage source configured to apply a direct-current bias voltage to the transistor when the transistor is open.

17. The wireless power transmitting device defined in claim 16 further comprising an inductance measurement circuit configured to measure an inductance of the wireless power transmitting coil.

18. A wireless power transmitting device configured to provide power wirelessly to a wireless power receiving device, the wireless power transmitting device comprising:
an output circuit having a wireless power transmitting coil;
an inverter that is coupled to an input of the output circuit and that is configured to transmit wireless power signals to the wireless power receiving device with the wireless power transmitting coil;
oscillator circuitry;
an inductor coupled between the oscillator circuitry and the output circuit;
a transistor in the output circuit that is coupled in series with the wireless power transmitting coil;
a voltage measurement circuit coupled to a first node between the transistor and the wireless power transmitting coil and configured to measure signals in the output circuit while the oscillator circuitry produces output at a probe frequency;
an impulse response measurement circuit coupled to a second node different than the first node and configured to measure an impulse response of the output circuit; and
control circuitry configured to:
open the transistor in the output circuit when making measurements with the voltage measurement circuit; and
close the transistor in the output circuit when transmitting the wireless power signals to the wireless power receiving coil and when making measurements with the impulse response measurement circuit.

19. The wireless power transmitting device defined in claim 18 further comprising a direct-current voltage source configured to apply a direct-current bias voltage to the transistor when the transistor is open.

20. The wireless power transmitting device defined in claim 19 further comprising a radio-frequency identifier checking measurement circuit coupled to the first node and configured to measure signals in the output circuit while the oscillator circuitry produces a frequency-swept output ranging from a first frequency to a second frequency that is less than the first frequency.

21. The wireless power transmitting device of claim 20, further comprising a capacitor coupled between the transistor and the wireless power transmitting coil.

22. The wireless power transmitting device of claim 21, further comprising a resistor coupled in series with the inductor between the oscillator circuitry and the first node.

23. The wireless power transmitting device of claim 22, further comprising an additional capacitor coupled in series with the inductor and the resistor between the oscillator circuitry and the first node, wherein the voltage measurement circuit comprises a first peak detector and first analog-to-digital converter circuitry, and wherein the radio-frequency identifier checking measurement circuit comprises a second peak detector and second analog-to-digital converter circuitry.

* * * * *